US012184346B2

(12) United States Patent
Gulati et al.

(10) Patent No.: US 12,184,346 B2
(45) Date of Patent: Dec. 31, 2024

(54) PREDICTIVE LINK ADAPTATION FOR V2X COMMUNICATIONS

(71) Applicant: QUALCOMM Incorporated, San Diego, CA (US)

(72) Inventors: Kapil Gulati, Belle Mead, NJ (US); Sudhir Kumar Baghel, Fremont, CA (US); Arjun Bharadwaj, Cupertino, CA (US); Shailesh Patil, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 17/647,972

(22) Filed: Jan. 13, 2022

(65) Prior Publication Data
US 2022/0140926 A1 May 5, 2022

Related U.S. Application Data

(62) Division of application No. 16/455,512, filed on Jun. 27, 2019, now Pat. No. 11,258,524.
(Continued)

(51) Int. Cl.
*H04B 17/318* (2015.01)
*H04B 7/06* (2006.01)
(Continued)

(52) U.S. Cl.
CPC .......... *H04B 17/318* (2015.01); *H04B 7/0626* (2013.01); *H04B 7/0632* (2013.01);
(Continued)

(58) Field of Classification Search
CPC .. H04B 7/0626; H04B 7/0632; H04B 7/0634; H04B 17/309; H04B 17/318;
(Continued)

(56) References Cited

U.S. PATENT DOCUMENTS

| 8,352,111 B2 | 1/2013 | Mudalige |
| 8,935,094 B2 | 1/2015 | Rubin et al. |
| (Continued) | | |

FOREIGN PATENT DOCUMENTS

| CN | 1866620 A | * | 11/2006 |
| CN | 105790893 A | | 7/2016 |
| (Continued) | | | |

OTHER PUBLICATIONS

Brahmi N., et al., "Deliverable D3.1 Intermediate 5G V2X Radio,"—5GCAR Version v1.0, May 31, 2018 (May 31, 2018), XP055610151, 121 pages, Internet Retrieved from the Internet: URL: https://5gcar.eu/wp-content/uploads/2018/08/5GCAR_D3.1_v1.0.pdf [retrieved on Jul. 31, 2019] section 3.3.2; p. 46-p. 47.
(Continued)

*Primary Examiner* — Khoa Huynh
(74) *Attorney, Agent, or Firm* — Procopio, Cory, Hargreaves & Savitch LLP

(57) ABSTRACT

A method, a computer-readable medium, and an apparatus are provided. The apparatus communicates with a second apparatus, including transmitting or receiving a first transmission. The apparatus receives information about the second UE from a sensor at the first UE and/or from a BSM. The apparatus determines whether the first apparatus and the second apparatus are in a LOS condition based on a correlation of the information with one or more of a channel estimation, PMI feedback, or RI feedback. The apparatus may adapt a transmission parameter for a second transmission based on a predicted location of the first apparatus or the second apparatus. The transmission parameter may include at least one of a modulation, a code rate, a DMRS density, a precoder, a CSI-RS transmission periodicity or a feedback rate.

27 Claims, 11 Drawing Sheets

Related U.S. Application Data

(60) Provisional application No. 62/691,591, filed on Jun. 28, 2018.

(51) Int. Cl.
*H04L 1/18* (2023.01)
*H04W 4/40* (2018.01)

(52) U.S. Cl.
CPC ............ *H04B 7/0634* (2013.01); *H04L 1/18* (2013.01); *H04W 4/40* (2018.02)

(58) Field of Classification Search
CPC ... H04B 17/373; H04L 1/0003; H04L 1/0009; H04L 1/0023; H04L 1/18; H04L 5/001; H04L 5/0023; H04L 5/0048; H04L 5/006; H04L 5/0082; H04L 25/0224; H04L 25/067; H04W 4/40
See application file for complete search history.

(56) References Cited

U.S. PATENT DOCUMENTS

| | | | |
|---|---|---|---|
| 9,253,592 | B1 | 2/2016 | Moscovich et al. |
| 9,577,857 | B2 | 2/2017 | Lauer et al. |
| 10,091,791 | B2 | 10/2018 | Jiang et al. |
| 2012/0225665 | A1 | 9/2012 | Alexander et al. |
| 2014/0179332 | A1* | 6/2014 | Qian ........................ H04L 1/20 455/452.1 |
| 2015/0311926 | A1* | 10/2015 | Eliaz .................... H04B 1/3833 375/297 |
| 2017/0055273 | A1 | 2/2017 | Sharma et al. |
| 2017/0273128 | A1* | 9/2017 | Abedini ................ H04W 76/14 |
| 2018/0152227 | A1 | 5/2018 | Frank et al. |
| 2019/0013853 | A1 | 1/2019 | Kela et al. |
| 2019/0059071 | A1 | 2/2019 | Khoryaev et al. |
| 2019/0313363 | A1* | 10/2019 | Pan ....................... H04W 40/02 |
| 2020/0007247 | A1 | 1/2020 | Gulati et al. |
| 2020/0091608 | A1* | 3/2020 | Alpman ............... H01Q 9/0414 |

FOREIGN PATENT DOCUMENTS

| | | |
|---|---|---|
| EP | 2854312 A1 | 4/2015 |
| KR | 20190003903 A | 1/2019 |
| WO | 2017162286 A1 | 9/2017 |

OTHER PUBLICATIONS

Choi J., et al., "Millimeter-Wave Vehicular Communication to Support Massive Automotive Sensing", IEEE Communications Magazine, IEEE Service Center, Piscataway, US, vol. 54, No. 12, Dec. 1, 2016, XP011637192, ISSN: 0163-6804, DOI: 10.1109/MCOM.2016.1600071CM [retrieved on Dec. 15, 2016], pp. 160-167, Sections "MmWave V2X Communications", "V2XMmWave Beam Alignment Using DSRC and/or Automotive Sensors" and "Evaluation of mmWave V2X Beam Alignment"; p. 162-p. 166 figures 2, 3.

ETRI: "Discussion on Downlink DMRS Design", 3GPP TSG RAN WG1 NR Ad-Hoc #2, 3GPP Draft; R1-1710612 Discussion on Downlink DMRS Design_Final, 3rd Generation Partnership Project (3GPP), Mobile Competence Centre ; 650, Route Des Lucioles; F-06921 Sophia-Antipolis Cedex; France, vol. RAN WG1, No. Qingdao, China; Jun. 27, 2017-Jun. 30, 2017, Jun. 17, 2017(Jun. 17, 2017), 5 Pages, XP051305162, Retrieved from the Internet: URL: http://www.3gpp.org/ftp/tsg_ran/WG1_RL1/TSGR1_AH/NR_AH_1706/Docs/ [retrieved on Jun. 17, 2017].

Gandia D.M.S., et al., "3GPP Long Term Evolution: Performance Analysis and Evolution towards 4G with Coordinated Multi-Point Transmission", A Thesis, Feb. 2016, 248 pages.

International Preliminary Report on Patentability—PCT/US2019/039947, The International Bureau of WIPO—Geneva, Switzerland, Jan. 7, 2021.

International Search Report and Written Opinion—PCT/US2019/039947—ISA/EPO—Jul. 30, 2020.

Ismayilov R., et al., "Adaptive Beam-Frequency Allocation Algorithm with Position Uncertainty for Millimeter-Wave MIMO Systems", arxiv.org, Cornell University Library, 201 Olin Library Cornell University Ithaca, NY 14853, Nov. 6, 2017 (Nov. 6, 2017), 5 Pages, XP081325628.

Nielsen J, et al., "Aalborg Universitet D3.5 Location Based CrossLayer Optimisation for PHY/MAC: Final", Jan. 1, 2010 (Jan. 1, 2010), XP055652820, Retrieved from the Internet: URL:https://vbn.aau.dk/files/42440988/Deliverable_D3.5.pdf, 83 Pages, [retrieved on Dec. 13, 2019].

NORTEL: "Discussion on Rank Adaptation Based on Shadowing for High Speed UEs", 3GPP TSG-RAN Working Group 1 Meeting #50, 3GPP Draft; R1-073296(NORTEL-Rank_Adaptation), 3rd Generation Partnership Project (3GPP), Mobile Competence Centre ; 650, Route Des Lucioles ; F-06921 Sophia-Antipolis Cedex; France, vol. RAN WG1, No. Athens, Greece; Aug. 15, 2007, Aug. 15, 2007 (Aug. 15, 2007), pp. 1-11, XP050106929, [retrieved on Aug. 15, 2007]. Sections 1-3;p. 1-p. 2, p. 8.

Partial International Search Report—PCT/US2019/039947—ISA/EPO—Oct. 14, 2019.

Sand S., et al., "Position Aware Adaptive Communication Systems", Signals, Systems and Computers, 2009 Conference Record of the Forty-Third Asilomar Conference on, IEEE, Piscataway, NJ, USA, Nov. 1, 2009 (Nov. 1, 2009), 7 Pages, XP031679681, ISBN: 978-1-4244-5825-7.

Wang Y., et al., "MmWave Beam Prediction with Situational Awareness: A Machine Learning Approach", May 23, 2018, 5 pages.

Wei Y., et al., "Adjacent Vehicle Number-Triggered Adaptive Transmission for V2V Communications", Sensors, vol. 18, No. 3, 755, Mar. 2018, pp. 1-11.

\* cited by examiner

PREDICTIVE LINK ADAPTATION FOR V2X COMMUNICATIONS

CROSS REFERENCE TO RELATED APPLICATION(S)

This application is a divisional of U.S. Non-provisional application Ser. No. 16/455,512, entitled "Predictive Link Adaptation For V2X Communications" and filed on Jun. 27, 2019, which claims the benefit of U.S. Provisional Application No. 62/691,591, entitled "Predictive Link Adaptation For CV2X Communications" and filed on Jun. 28, 2018, which is expressly incorporated by reference herein in its entirety.

BACKGROUND

Technical Field

The present disclosure relates generally to communication systems, and more particularly, to link adaptation for wireless communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. Wireless communication may include communication based on vehicle-to-vehicle (V2V), vehicle-to-everything (V2X), or Device to Device (D2D) networks. There exists a need for further improvements in wireless communication technology. These improvements may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The unique circumstances of V2X communication leads to challenges in performing link adaptation. Feedback may be provided at an end of a Transmission Time Interval (TTI), and messages may be transmitted with a lower periodicity, e.g., longer than a channel coherence time. Vehicles may travel an high relative speeds, which may lead to a channel changes in channel conditions between transmissions.

Aspects presented herein provide for more accurate link adaptation by enabling a UE to more accurately determine whether a line-of-sight (LOS) condition exists with another UE and/or to perform link adaptation based on a prediction of a location or trajectory of a UE.

In an aspect of the disclosure, a method, a computer-readable medium, and an apparatus are provided. The apparatus transmits a signal to, or receiving a signal from, a second apparatus. The apparatus receives information about the second UE from a sensor at the first UE or from a basic safety message (BSM). The apparatus determines whether the apparatus and the second apparatus are in a LOS condition based on a correlation of the information about the second UE with one or more of a channel estimation, precoding matrix indicator (PMI) feedback, or rank indicator (RI) feedback.

In another aspect of the disclosure, a method, a computer-readable medium, and an apparatus are provided. The apparatus communicates with a second apparatus, including transmitting or receiving a first transmission. The apparatus adapts a transmission parameter for a second transmission based on a predicted location of the apparatus or the second apparatus, the transmission parameter including at least one of a modulation, a code rate, a demodulation reference signal (DMRS) density, a precoder, a channel state information-reference signal (CSI-RS) transmission periodicity and a feedback rate.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
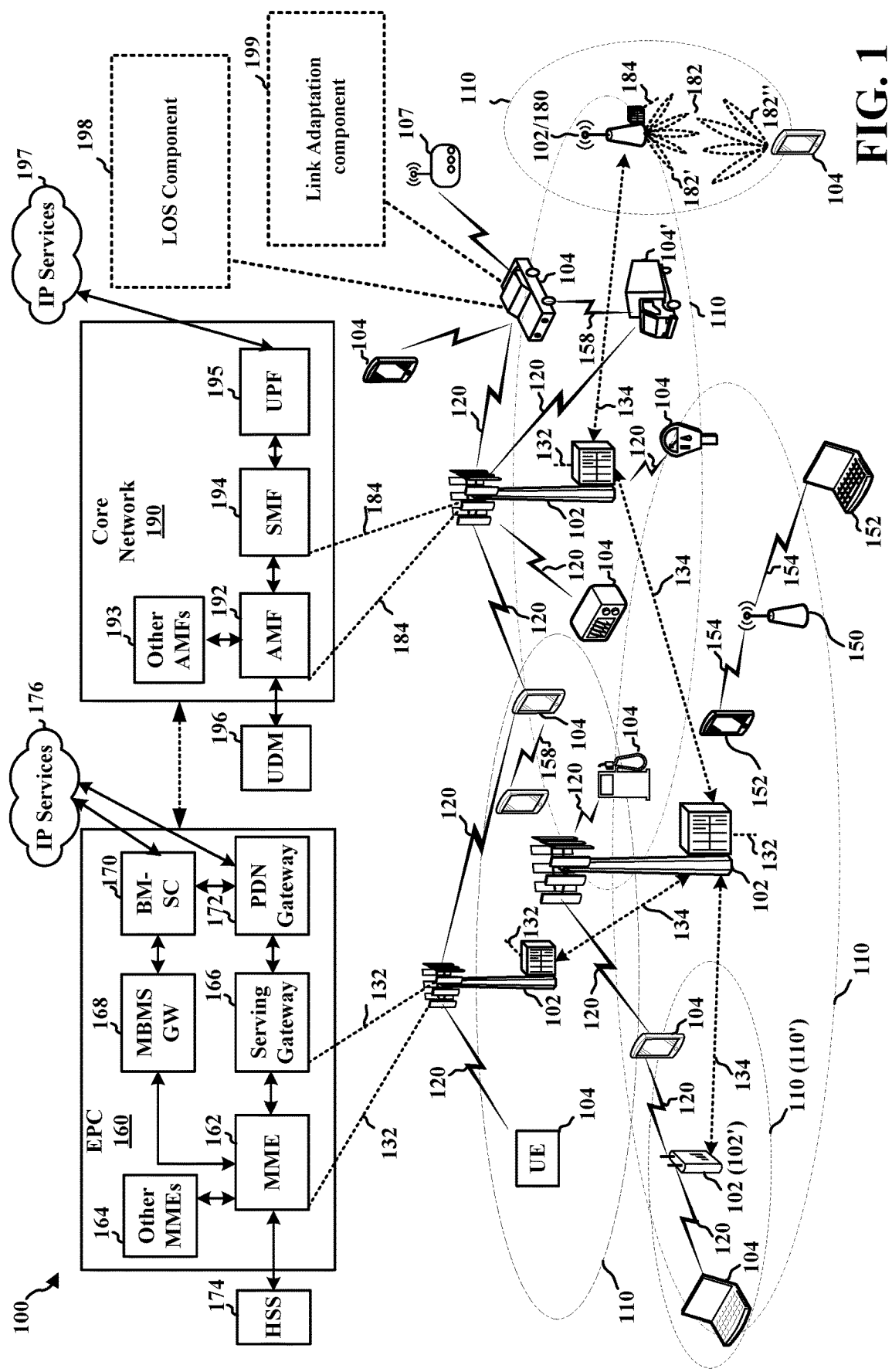
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1A illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), and/or a combination thereof and/or with other devices, which can be collectively referred to as vehicle-to-anything (V2X) communications. Such wireless communication may comprise cellular vehicle-to-anything (CV2X) communication. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2.

Referring again to FIG. 1, in certain aspects, a first UE 104 may comprise an LOS component 198 configured to determine whether the UE 104 and a second UE, e.g., UE 104', are in a LOS condition based on a correlation between information from a sensor/BSM and one or more of a channel estimation, a precoding matrix indicator (PMI) feedback, or a rank indication (RI) feedback. In some aspects, the UE may comprise a Link Adaptation Component 199 configured to adapt a transmission parameter for a communication link 158 between the first UE 104 and the second UE 104' based on a predicted location for one of the UEs.

Figure 2:
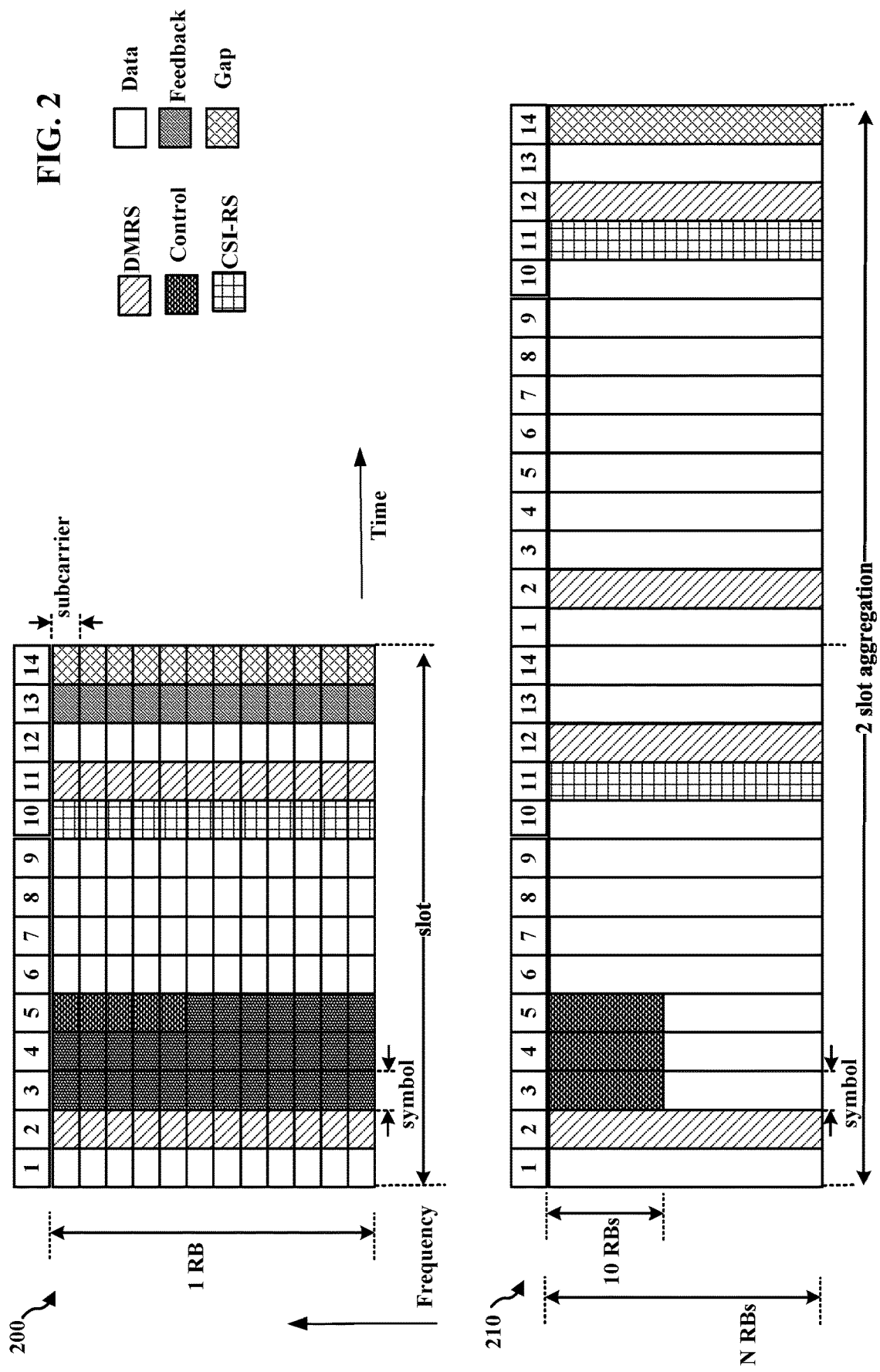
FIG. 2 illustrates example slot structures for wireless communication.

FIG. 2 illustrates example diagrams 200 and 210 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
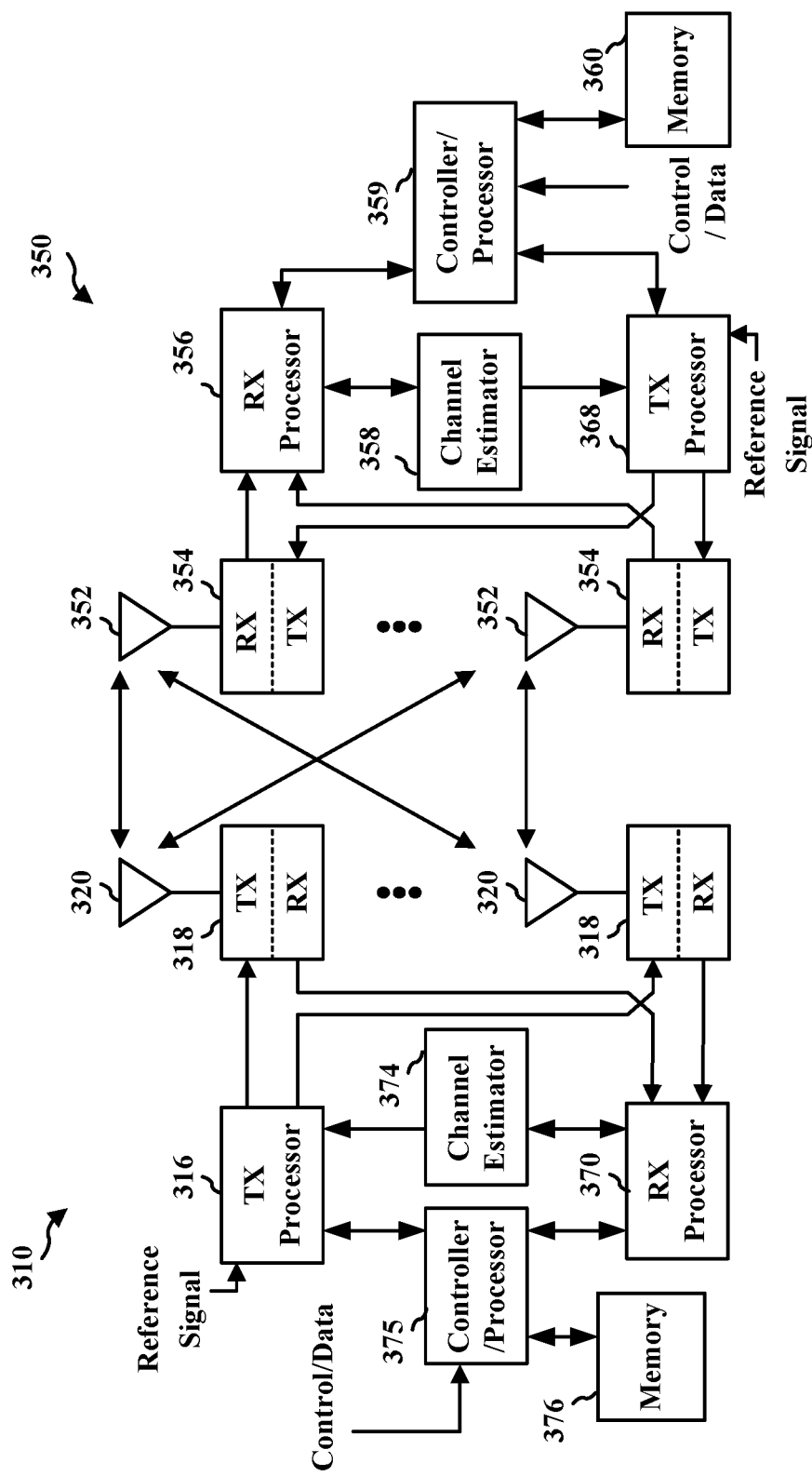
FIG. 3 is a diagram illustrating an example of a base station and user equipment (UE) in an access network.

FIG. 3 is a block diagram 300 of a first wireless communication device 310 in communication with a second wireless communication device 350, e.g., via V2V/V2X/CV2X/D2D communication. The device 310 may comprise a transmitting device communicating with a receiving device, e.g., device 350, via V2V/V2X/CV2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, the controller/processor 359, the TX processor 316, the RX processor 370, and the controller/processor 375 may be configured to perform aspects in connection with 198 and/or 199 of FIG. 1.

Figure 4:
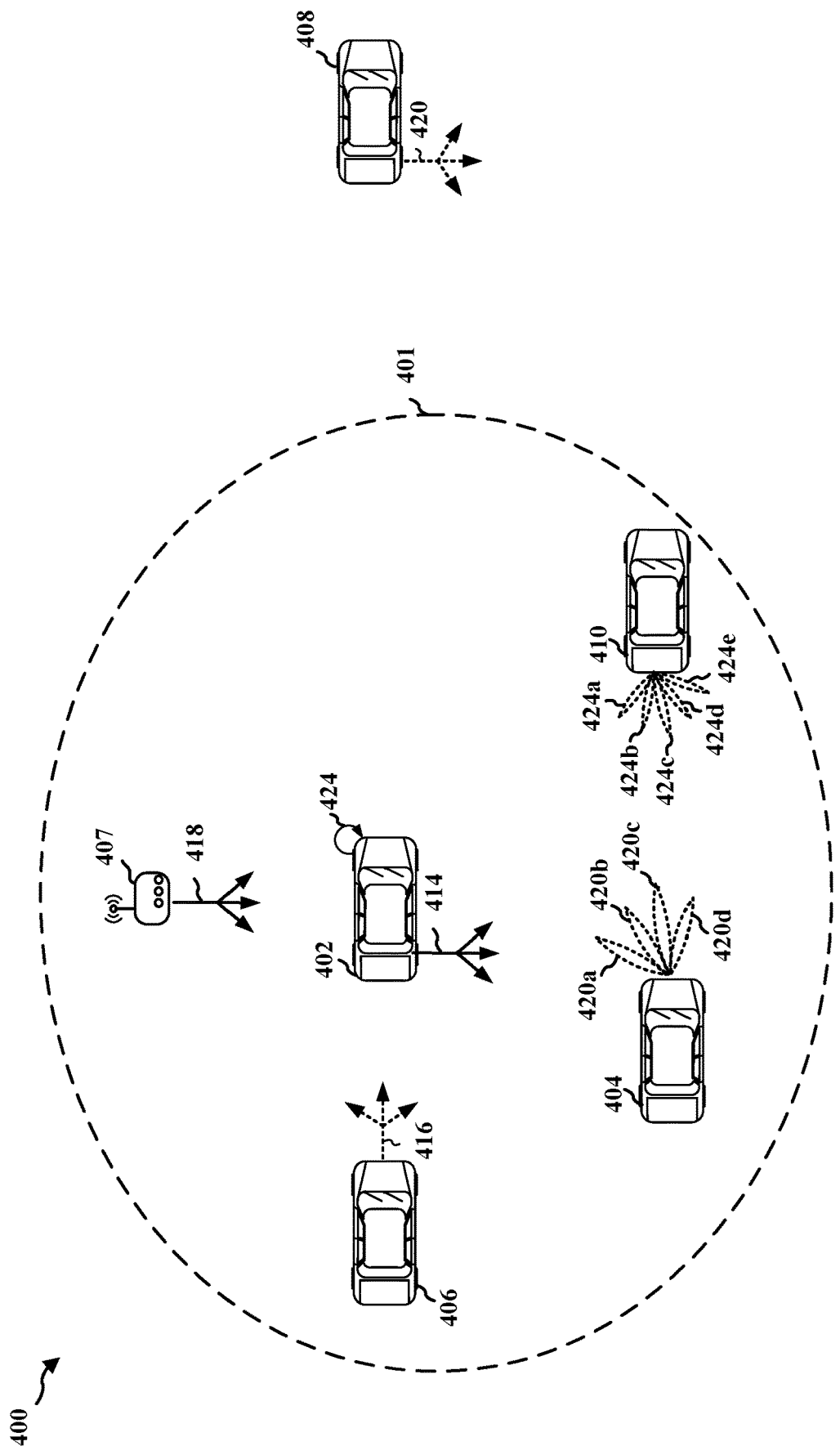
FIG. 4 is a diagram illustrating a first wireless node in communication with a second wireless node.

FIG. 4 illustrates an example 400 of wireless communication between devices based on V2X/V2V/CV2X/D2D communication. Transmitting UE 402 transmits a transmission 414, e.g., comprising a control channel and/or a corresponding data channel, that may be received by receiving UEs 404, 406, 408, 410. The UEs 402, 404, 406, 408, 410 may each be capable of operating as a transmitting UE in addition to operating as a receiving UE. Thus, UE 408 is illustrated as transmitting a transmission 420. The transmissions 414, 420 may be unicast, broadcast, or multicast to nearby UEs. In addition to receiving UEs 404, 406, 408, 410, the transmitting UE 402 may also transmit or receive communication from RSU 407 and other devices. Such other devices may comprise infrastructure, pedestrians, different types of UEs, and/or base stations. As illustrated in FIG. 4, the UEs may transmit and receive beamformed signals. For example, UE 410 may receive a beamformed signal from the UE 404 in one or more receive directions 424a, 424b, 424c, 424d, 424e. UE 404 may also transmit a beamformed signal to the in one or more of the directions 420a, 420b, 420c, 420d. The UE 404, 410 may perform beam training to determine the best receive and transmit directions. The transmit and receive directions for the UE 404 may or may not be the same. The transmit and receive directions for the UE 410 may or may not be the same.

Link adaptation between a base station, e.g., base station 102/180, and a UE, e.g., UE 104, may be determined by a base station based on feedback from a UE. For example, the base station may transmit a signal, and the UE may provide feedback to the base station. Link adaptation may include adapting a modulation scheme and/or a coding rate of the error correction based on the quality of the radio link. If the conditions of the radio link are good, a more efficient modulation scheme and a smaller amount of error correction may be used. If the quality of the radio link is poor, a less efficient modulation scheme and/or a higher amount of error correction may be used. For example, the feedback may comprise any of Channel Quality Indicator (CQI) feedback, Rank Indicator (RI) feedback, and/or a Precoding Matrix Indicator (PMI) feedback. Based on the feedback received from the UE, the base station may determine a precoder or rank for further communication with the UE. Thus, the base station may adapt the link based on the feedback from the UE. The base station may also adapt the link based on a reciprocity assumption in which the downlink channel is assumed to have a similar quality to an uplink channel received from the UE. For example, the UE may transmit a sounding reference signal (SRS) that the base station may use to perform a channel estimation. The base station may use the channel estimation for the uplink channel to select a precoder and/or rank in combination with the feedback from the UE, e.g., including any of CQI, RI, PMI, and/or CSI-RS port indication for CQI estimation.

V2X/V2V/D2D communication, such as unicast CV2X communication, involves unique challenges for performing link adaptation. As one example, the communication may rely on feedback that is received by the transmitter at the end of a transmission, for example, with back-loaded CSI-RS. For example, FIG. 2 illustrates an example feedback position in a symbol near the end of a slot. A Front loaded CSI-RS with feedback and control occurring prior to data transmissions may not be preferred as this may create frequency division multiplex (FDM) issues with multicast/broadcast traffic, e.g., due to reception power variations within Transmission Time Interval (TTI). As well, a gap may be needed between the reference signal and the feedback, and additional time may be needed to apply the feedback to the data transmission. Additional overhead may be needed for Automatic Gain Control (AGC) retraining and for additional RS for noise estimation.

The feedback received at or near the end of a transmission may be used to update the transmission parameters (e.g., CQI, rank, and/or precoder) for a following transmission. However, V2X communication may have a long message periodicity that may extend beyond a channel coherence time. For example, messages might occur with a spacing of 100 ms or more. As well, vehicles may have high relative speeds that can lead to large scale changes in parameters, e.g. pathloss or SNR, between transmissions. Thus, the channel conditions may be very different for the next transmission, and the feedback provided at the end of a previous transmission might not be applicable for subsequent channel conditions. As well, link adaptation may be applied in a conservative manner in order to take into account the potential variations that may occur between messages. If a V2X transmitter relies on feedback to adapt a link with a receiver, this combination of aspects may lead to less effective transmission parameters being applied by the transmitter.

Aspects presented herein provide a predictive link adaptation that may use a predicted location in performing link adaptation. The predicted location may include a prediction of a future location of a transmitting UE, e.g., such as UE 402, and/or a prediction of a future location of a receiving UE, e.g., such as UE 406. The predicted location may be based on a current location of the UE and a predicted change in location for the UE. The predicted location may use a current location of the UE and trajectory information for the UE. A BSM may be transmitted by a UE, e.g., by UE 406 or 404. For example, transmission 416 may correspond to a BSM from UE 406. The BSM may include information including any of a location for UE 406, a current speed of UE 406, a heading for UE 406, a direction of travel for the UE 406, and/or a braking status for UE 406. Similarly, each of UEs 402, 404, 408, 410 may transmit a BSM with their respective location, speed, and/or heading information.

Under certain radio propagation conditions, a transmitting UE may predict future channel conditions and may select transmission parameters (such as a precoder for a DFT beam, an SNR, etc. can be predicted by the transmitting UE. The prediction may be based, at least in part, on information from a BSM. The radio propagation condition may comprise a line-of-sight (LOS) condition. An LOS condition may refer to a condition in which a dominant LOS path exists between the transmitting UE and the receiving UE. As an example, a dominant LOS path may refer to a path in which the energy is stronger than the sum energy in the non LOS paths. The LOS condition may correspond to a mode in which the transmitting UE or a receiving UE can predict a location of the other UE and/or predict the channel condition to the other UE at a future time instant based on the current location, speed, and heading information of the other UE. For example, in a LOS channel condition, the transmission parameters, such as precoder for DFT beam, SNR, etc., can be predicted and adapted, as presented herein. Therefore, the transmitter 502, or the receiver 504, may perform predictive link adaption using location and trajectory information from BSM 508. The condition may correspond to a mode or condition in which a transmitting UE and/or a receiving UE determines to apply a predictive link adaptation.

Thus, aspects presented herein may include determining if a LOS condition exists between a first UE and a second UE. The condition may be referred to herein as an LOS condition. However, this is merely an example name for the condition. The condition or mode may also be referred to by another name. The determination may be made by a transmitting UE. The determination may be made by a receiving UE and communicated to the transmitting UE. The determination may be made jointly by the transmitting UE and the receiving UE.

Figure 5A:
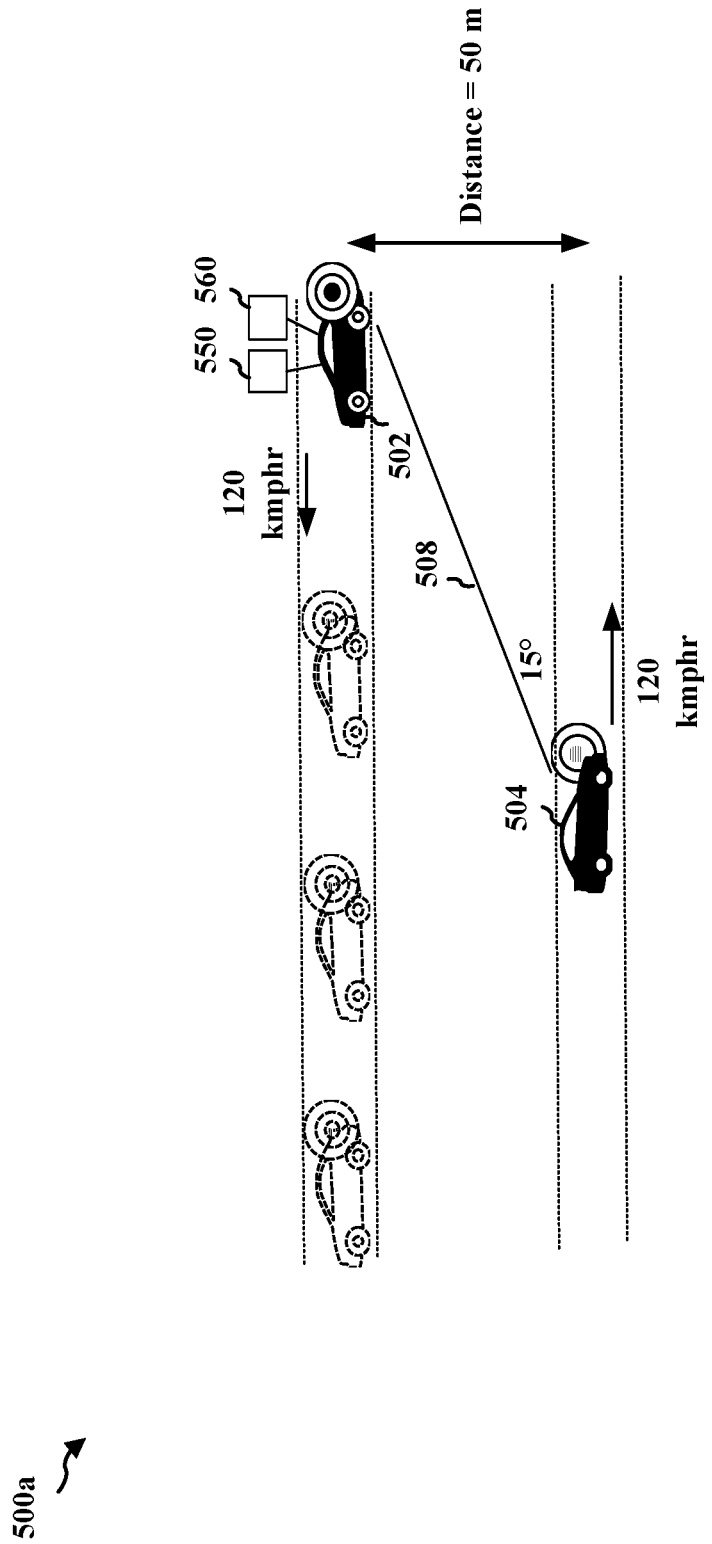
FIG. 5A is a diagram of a V2X communication system.

FIG. 5A is a diagram of a V2X communication system 500a. UE 502 and UE 504 may transmit and receive wireless communication with each other. The communication may be transmitted/received over a unicast link based on V2X. UE 502 may comprise one or more sensors 550. Example sensors may include a radar, a camera, etc. UE 502 may receive measurements, such as radar measurements regarding UE 504. UE 502 may also comprise a BSM component 560 that receives a BSM from UE 504, including information regarding the location (e.g., location, speed, heading, breaking information, etc.) for a vehicle 504. The sensor measurements or BSM information may help UE 502 to determine a location and/or trajectory of UE 502 relative to UE 504. UE 504 may determine a distance between the UEs, a speed at which the UEs are traveling, an angle at which communication is received by UE 504, etc.

Figure 5B:
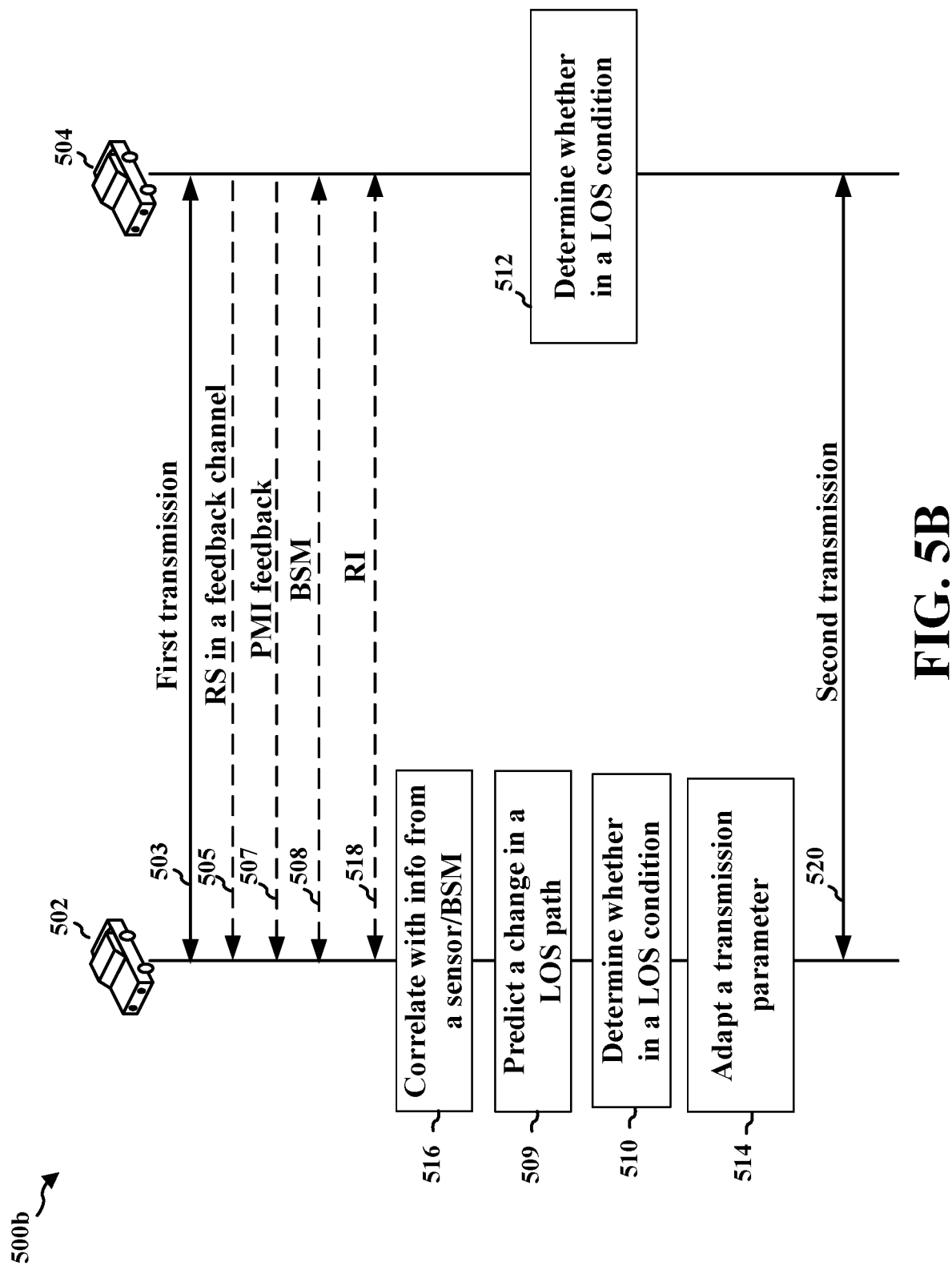
FIG. 5B is a diagram illustrating communication between a first UE and a second UE.

FIG. 5B is a diagram 500b illustrating aspects of an example communication flow between UE 502 and UE 504 that may include a LOS determination and/or predictive link adaptation. The wireless communication may comprise unicast V2X communication.

UE 502 may transmit a signal to, or receiving a signal from UE 504, as illustrated at 503. UE 502 may determine whether the UE 502 and UE 504 are in a LOS condition, as illustrated at 510. As described herein, the determination may be based on information from sensor(s) 550 and/or BSM information received by BSM component 560 and a correlation with one or more of a channel estimation (at 505), precoding matrix indicator (PMI) feedback (at 507), or rank indicator (RI) feedback (at 518).

As an example, the LOS condition may be determined based on a channel estimation, e.g., for a reverse channel from the UE 504 to UE 502. The channel estimation may be based on a reference signal (RS) in a feedback channel, as illustrated at 505. For example, the channel estimation may be based on a message transmission, e.g., 503, between UE 502 and UE 504. UE 502 may compare the channel estimation to the information received from the sensor(s) or information from a BSM in order to determine whether there is a correlation between the channel estimation and the sensor/BSM information, e.g., at 516. A correlation may indicate a LOS indication. As well, the channel estimation should identify a dominant path, e.g., a LOS path.

As another example, in addition or alternative to the above, the LOS condition may be determined based, at least partially, on variations in the PMI feedback from UE 504 within a time period, as illustrated at 507. UE 502 may compare the received PMI feedback to the received sensor/BSM information. Since the BSM includes information such as vehicle location and direction of travel, speed, braking status, etc., the information from BSM may be compared to the variations in the PMI feedback to determine whether the first UE 502 and the second UE 504 are in the LOS condition. A correlation between the variations in the PMI feedback and the information received about UE 504 from the sensor(s)/BSM may indicate a LOS condition.

As another example, in addition or alternative to the above, the LOS may be determined based, at least partially, on rank indicator feedback received from UE 504, e.g., as illustrated at 518. For example, if rank indicator feedback indicates a rank-1 (without cross polarization) or rank-2 (with cross polarization), then this information can be considered jointly with other factors (such as channel estimation and/or BSM information and/or information from other sensors) to determine the presence of a LOS path, e.g., to determine a LOS condition. For example, a correlation between sensor/BSM information and the RI feedback may be used to determine a LOS condition.

A LOS condition may refer to a condition in which a dominant LOS path exists between two UEs. A dominant LOS path may refer to a path in which the energy is stronger than the sum energy in the non-LOS paths. Thus, UE 502 may determine whether the energy of the LOS path is stronger than the sum energy of the non-LOS paths between the first UE and the second UE. In some aspects, this determination can be done performed by a transmitting UE (e.g., UE 502), a receiving UE (e.g., UE 504), or jointly by both the transmitting and receiving UE. For example, as illustrated at 512, UE 504 may perform aspects associated with determining whether a LOS condition exists between UE 502 and UE 504. Likewise, a decision to enable a predictive link adaptation mode can be made by a transmitting UE (e.g., UE 502), a receiving UE (e.g., UE 504), or jointly by both the transmitting and receiving UE.

After determining a LOS condition, UE 502 may adapt a transmission parameter for a second transmission 520 following first transmission 503 based on a predicted location and/or trajectory of UE 502 and/or UE 504, as illustrated at 514.

As an example, the code rate may be adapted in a predictive manner based on predicted CQI feedback for a predicted change in path-loss between UE 502 and UE 504. The predicted path-loss and predicted CQI feedback may be based on a predicted location for UE 502 and/or UE 504. For example, the CQI feedback may be adjusted by adjusting Acknowledgment/Negative Acknowledgment (ACK/NACK) feedback. For example, if CQI is determined based on a formula such as CQI=(1−α)*(feedback CQI)+α*(predicted CQI). The coefficient α may be varied based on the reception at UE 502 of ACK/NACK from UE 504. The code rate may be adjusted according to the CQI determined based on the formula. Thus, the code rate may be adjusted based on a CQI prediction that may be based on predicted future locations for UE 502 and UE 504.

As another example, DMRS density may be adapted based, at least partially, on whether a dominant LOS path is determined to exist. The DMRS density may be adapted further based on a modulation and coding scheme (MCS). For example, if a dominant LOS path is identified and a lower MCS is being used, then UE 502 may adjust the density of the DMRS. For example, UE 502 may use a lower time density of DMRS in such a situation, because the Doppler shift can be estimated and corrected with the lower density (e.g., based on a front loaded DMRS and a back loaded DMRS). When a dominant LOS path is not identified and/or when a higher MCS is used, UE 502 may use a more dense DMRS.

As another example, when a LOS condition is determined, the precoder may be adapted to rotate a PMI feedback precoder that is based on a predicted change in an angle of arrival (AoA) to the second UE 504. FIG. 5A illustrates an example AoA for communication from UE 502 to UE 504. The adaptation might not be restricted by PMI quantization. Further, rotating the PMI feedback precoder may be performed with an assumption of coherent uplink transmission. In one aspect, the beam width may also be modified. The beam width may be adjusted as more than a simple rotation, e.g., based on an expected range in the location of UE 502/504 at a future transmission time. For example, a beam width may be adapted based on an expected range of the predicted location of the first UE 502 or the second UE 504. In one aspect, a set of beams/precoders may be derived based on an expected range of a predicted location. UE 502 may cycle though those precoders over the bandwidth of the second transmission 520. For example, a set of precoders may be selected based on a probability of the predicted location of the first UE 502 or the second UE 504. For example, the first UE 502 may cycle through the set of precoders over a bandwidth of the second transmission. For example, the first UE 502 may cycle every tone as Open Loop Spatial Multiplexing (OLSM), or the first UE 502 may perform sub-band based cycling. For example, control signaling from the first UE 502 may indicate the precoders being cycled though. For another example, the precoder may be adapted based on a predicted location of the first UE 502, the predicted location of the second UE 504, and a predicted AoA to the second UE.

In some aspects, the feedback rate may be adapted based on CSI-RS and feedback periodicity. For example, the feedback rate may be adapted based on a predicted change in at least one of a location and a trajectory of the second UE 504, and/or the first UE 502. For example, the feedback rate may be adapted based on a change in a position/trajectory, including the position/trajectory of the transmitter (e.g., UE 502), and/or the receiver (e.g., UE 504). For example, a higher feedback rate may be used when the first UE 502 and the second UE 504 are traveling on straight path, while a lower feedback rate may be selected when the first UE 502 and/or the second UE 504 changes course, e.g., changes lanes, etc. For example, the feedback rate may be adapted based on ACK/NACK feedback between the first UE 502 and the second UE 504.

Figure 6A:
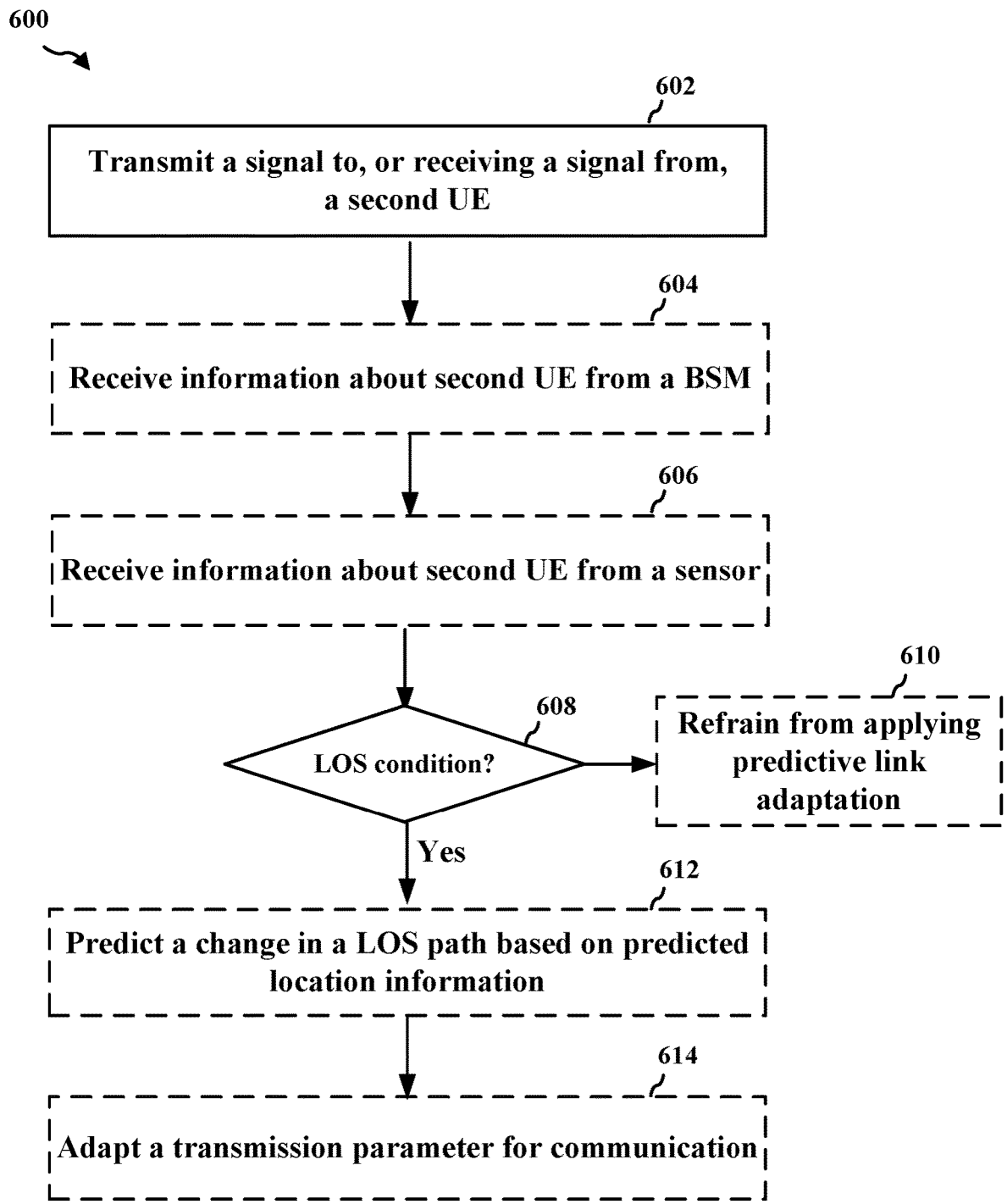
FIGS. 6A and 6B illustrate aspects of a flowchart of a method of wireless communication.
Figure 6B:
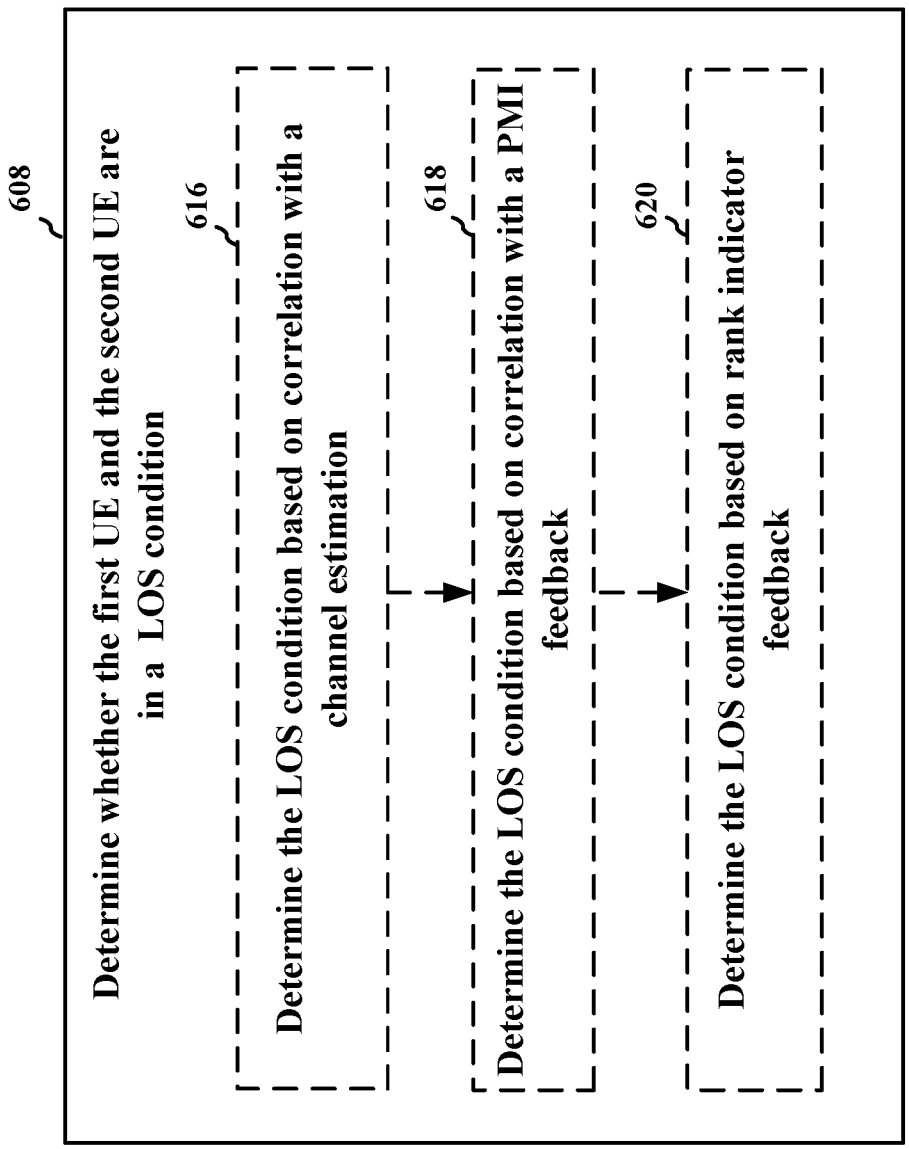

FIGS. 6A and 6B illustrate aspects of a flowchart 600 of a method of wireless communication. The method may be performed by a first UE (e.g., UE 104, 350, 402, 502, the apparatus 802, 802'; the processing system 914, which may include memory 906 and which may be the entire UE 350 or a component of the UE 350, such as the TX processor 368, the RX processor 356, and/or the controller processor 359) communicating with a second UE (e.g., 310, 404, 504, 850). The wireless communication may comprise CV2X communication, as described herein. Optional aspects are illustrated with a dashed line. The wireless communication may comprise V2X/V2V/CV2X/D2D communication, as described herein. Optional aspects are illustrated with a dashed line. The method may improve communication between UEs by enabling a UE to detect certain conditions, such as an LOS condition in which the UE may predict a location and/or trajectory of the second UE. This may enable the first UE to improve communication between the UEs by performing predictive link adaptation based on a predicted location and/or trajectory of the UEs in certain conditions.

At 602, the first UE transmits a signal to, or receives a signal from, a second UE. For example, the transmission or reception may be performed by reception component 804 or transmission component 806 of apparatus 802. The first UE and the second UE may communicate with each other based on CV2X communication. Thus, the first UE and the second UE may comprise mobile UEs, e.g., such as a UE located in a vehicle.

The UE then receives information about the second UE from a sensor at the first UE or from a BSM. For example, at 604, the UE may receive information about the second UE from a BSM from the second UE. The information may comprise operation information about a vehicle associated with the second UE. The vehicle operation information may include any of a location of the vehicle associated with the second UE, a direction or path of the vehicle associated with the second UE, a speed of the vehicle associated with the second UE, braking information for the vehicle associated with the second UE, etc. Alternatively or additionally, at 606, the UE may receive the information about the second UE from a sensor at the first UE. The sensor may comprise a radar sensor, a camera, etc. that may provide information about a location and/or a trajectory of the vehicle associated with the second UE relative to the first UE. For example, the reception of the information about the second UE may be performed by sensor component 812 or BSM component 830 of apparatus 802.

At 608, the first UE determines whether the first UE and the second UE are in a LOS condition based on a correlation of the information about the second UE, received at 604 and/or 606, with one or more of a channel estimation, PMI feedback, or rank indicator (RI) feedback. The determination may be performed by LOS determination component 826 of apparatus 802.

At a first point in time, the first UE may determine that the first UE and the second UE are not in the LOS condition. Then, at a second point in time, the first UE may determine that it is a LOS condition with the second UE. Thus, the two UE's might not be in an LOS condition initially. For example, an energy of a LOS path may be weaker than a sum energy of non-LOS (NLOS) paths between the first UE and the second UE when transmitting or receiving the first signal or prior to transmitting or receiving the first signal. However, at a later point in time, the first and second UE may be in an LOS condition that may be detected by the first UE in the manner described herein.

FIG. 6B illustrates example aspects that may be included in the determination as to whether the first UE and the second UE are in a LOS condition, at 608. The first UE may perform the determination about the LOS condition based on one or more of 616, 618, or 620.

As illustrated at 616, the LOS condition may be determined, at least partially, based on the correlation of the information about the second UE with the channel estimation. The channel estimation may comprise a channel estimation based on a reverse channel from the second UE to the first UE. For example, the channel estimation may be based on a reference signal (RS) in a feedback channel (e.g., 505), and/or a message transmission (e.g., 503) between the first UE and the second UE. The channel estimation may be performed by channel estimation component 808 of apparatus 802.

As illustrated at 618, the LOS may be determined, at least partially, based on the correlation of the information about the second UE with PMI feedback from the second UE. For example, the first UE may determine a correlation between the information about the second UE and variations in the PMI feedback (e.g., 507) from the second UE within a time period. The variations in the PMI feedback may be determined by PMI component 810 of apparatus 802.

As illustrated at 620, the LOS may be determined, at least partially, based on the correlation of the information about the second UE with rank indicator feedback. The rank indicator feedback may be determined by RI component 814 of apparatus 802.

A LOS condition may refer to a condition in which a dominant LOS path exists between two UEs. An LOS condition may refer to a condition in which the energy in the LOS path is stronger than the sum energy of other Non-LOS paths. Thus, determining whether the first UE 502 and the second UE 504 are in a LOS condition may comprise determining whether the energy of the LOS path is stronger than the sum energy of the non-LOS (NLOS) paths between the first UE and the second UE. The determination may be performed by the LOS determination component 826 of apparatus 802.

In some aspects, the LOS determination can be performed by a transmitting UE. In another example, the LOS determination may be performed by a receiving UE. The receiving UE may indicate the determination to the transmitting UE. In another example, the transmitting UE and the receiving UE may perform the determination in a joint manner.

If the LOS condition is not determined, at 608, the first UE may refrain from applying predictive link adaptation for communication with the second UE, at 610.

If the LOS condition is determined, the first UE may adapt a transmission parameter for a second transmission, at 614, e.g., as described in further detail in connection with FIG. 7. Thus, aspects of the method of FIG. 7 may be performed in combination with the aspects of FIGS. 6A and/or 6B. The transmission parameter that is adapted may comprise at least one of a modulation, a code rate, a demodulation reference signal (DMRS) density, a precoder, a channel state information-reference signal (CSI-RS) transmission periodicity or a feedback rate. The adaptation of the transmission parameter(s) may be performed by adaptation component 816 of apparatus 802.

As illustrated at 612, the first UE may further predict a change in an LOS path based on predicted location information for at least one of the first UE and the second UE. The prediction may be performed by prediction component 832. The adjustment to the transmission parameter(s) may be applied based on the first UE's predicted change in the LOS path.

The decision to enable a predictive link adaptation mode can be made solely by the first UE, solely by the second UE and indicated to the first UE, or jointly by the first UE and the second UE.

Figure 7:
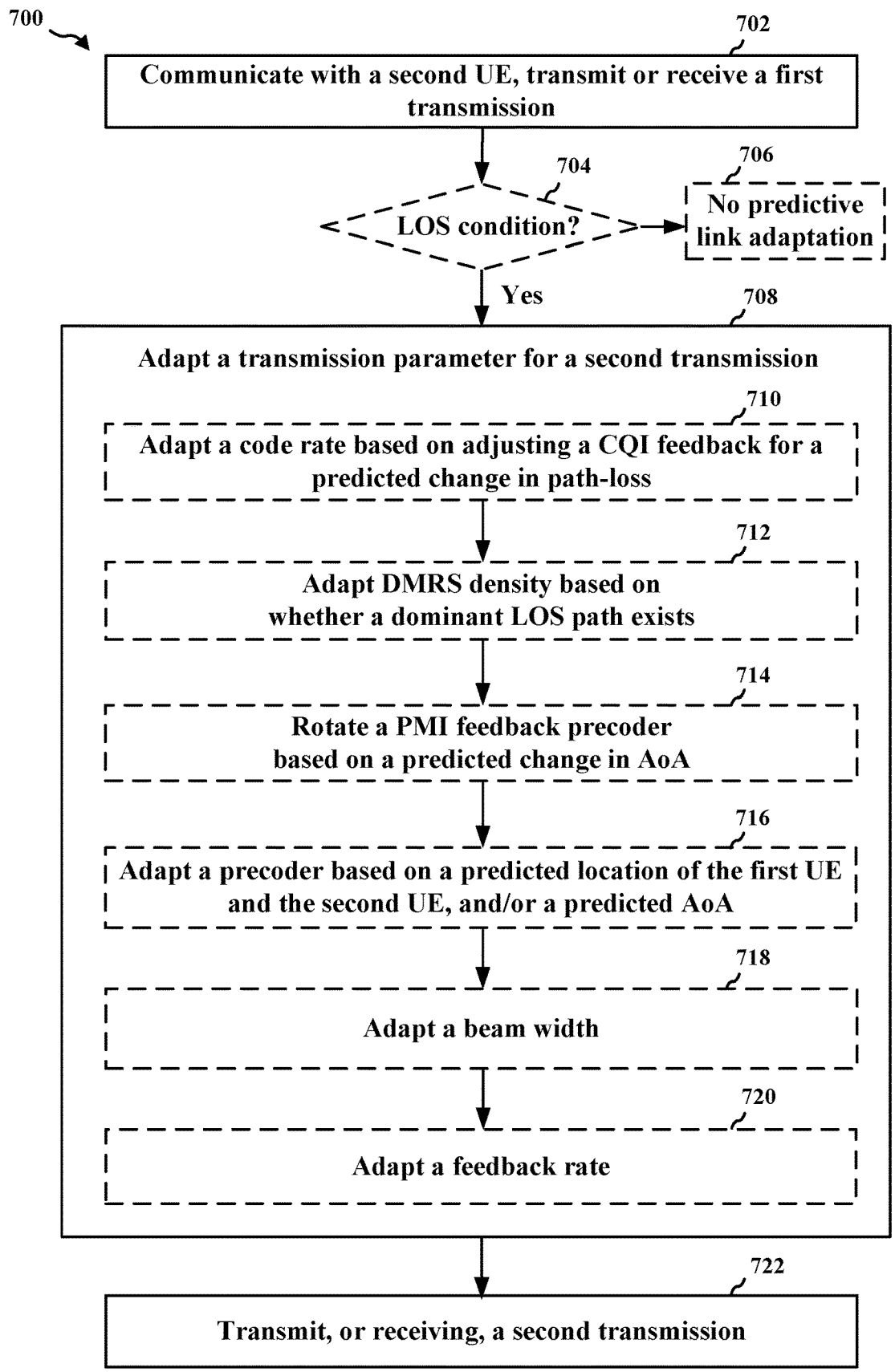
FIG. 7 is a flowchart of a method of wireless communication.

FIG. 7 is a flowchart 700 of a method of wireless communication. The method may be performed by a first UE (e.g., UE 104, 350, 402, 502, the apparatus 802, 802'; the processing system 914, which may include memory 906 and which may be the entire UE 350 or a component of the UE 350, such as the TX processor 368, the RX processor 356, and/or the controller processor 359) communicating with a second UE (e.g., 310, 404, 504, 850). The wireless communication may comprise V2X/V2V/CV2X/D2D communication, as described herein. Optional aspects are illustrated with a dashed line. The method may improve communication between UEs by enabling a UE to perform predictive link adaptation based on a predicted location and/or trajectory of the UEs in certain conditions.

At 702, the first UE communicates with the second UE, including transmitting or receiving a first transmission. For example reception of communication from the second UE may be performed by reception component 804 of apparatus 802. Transmission of communication to the second UE may be performed by transmission component 806 of apparatus 802.

At 704, the first UE may determine whether the first UE and the second UE are in LOS condition. The determination may be performed by LOS determination component 826. For example, the first UE may perform aspects described in connection with the determination at 608 in FIG. 6B. If the first UE determines that there is not a LOS condition, the first UE may refrain from performing predictive link adaptation, at 706.

At 708, in response to the determination that the first UE and the second UE are in LOS condition, the first UE adapts a transmission parameter for a second transmission to the second UE based on a predicted location of the first UE and/or the second UE. The adaptation of the transmission parameters may be performed by adaptation component 816 of apparatus 802. The predicted location corresponds to a prediction of a future location of the first UE or the second UE. For example, the predicted location may be based on a current location of the first UE or the second UE in combination with a predicted change in location for the respective UE. For example, the predicted location may be based on location information and/or trajectory information about the first UE and/or the second UE. The predicted location may be based on information received in a BSM from the second UE. In another example, the predicted location may be determined based on sensor information, e.g., measurements, from a sensor at the UE. The sensor may comprise a radar, a camera, etc. The prediction of the location may be performed by prediction component 832, e.g., based on information received by sensor component 812 and/or BSM component 830.

The transmission parameter that is adjusted may correspond to a parameter for the link between the first UE and the second UE. For example, the transmission parameter may include at least one of a modulation, a code rate, a demodulation reference signal (DMRS) density, a precoder, a channel state information-reference signal (CSI-RS) transmission periodicity and a feedback rate.

As illustrated at 710, the first UE may adapt the code rate based on adjusting a CQI feedback for a predicted change in path-loss between the first UE and the second UE. For example, the code rate component 818 in apparatus 802 may perform the adaptation. For example, adjusting the CQI feedback may include adjusting ACK/NACK feedback. For example, the CQI feedback may be adjusted based on a formula such as CQI=(1−α)*(feedback CQI)+α*(predicted CQI). The coefficient α may be varied based on ACK/NACK reception from the second UE.

As illustrated at 712, the first UE may adapt the DMRS density based on whether a dominant LOS path exists and/or based on a modulation and coding scheme (MCS). For example, the DMRS density component 820 in apparatus 802 may perform the adaptation. For example, if a dominant LOS exists and a lower MCS is being used, then the time density of DMRS may be reduced because the Doppler shift can be estimated and corrected with the lower DMRS density. For example, the DMRS density may be reduced to a front loaded and back loaded DMRS.

As illustrated at 714, the first UE may adapt the precoder to rotate a PMI feedback precoder that is based on a predicted change in an AoA relative to the second UE. For example, the precoder component 822 in apparatus 802 may perform the adaptation.

As illustrated at 716, the UE may adapt a precoder by selecting a set of precoders based on the expected range of the predicted location of the first UE or the second UE. For example, the precoder component 822 in apparatus 802 may perform the adaptation. The expected range may correspond to an estimated range. For example, the first UE may cycle through the set of precoders over a bandwidth of the second transmission. As another example, the precoder may be adapted, at 716, based on a predicted location of the first UE, the predicted location of the second UE, and a predicted AoA to the second UE.

As illustrated at 718, adapting the transmission parameter may comprise adjusting a beam width based on an expected range of the predicted location of the first UE or the second UE. For example, the beam width component 828 in apparatus 802 may perform the adaptation.

As illustrated at 720, the first UE may adapt the feedback rate based on a predicted change in at least one of a location and a trajectory of the second UE, and/or the first UE. For example, the feedback rate component 824 in apparatus 802 may perform the adaptation. For example, the feedback rate may be adapted based on change in position/trajectory, including the position/trajectory of the transmitter (e.g., the first UE), and/or the receiver (e.g., the second UE). For example, a higher feedback rate may be adapted when the first UE and the second UE are going on straight path, while a lower feedback rate may be adapted when one of the first UE and the second UE is changing lanes. As another example, the feedback rate may be adapted based on ACK/NACK feedback between the first UE and the second UE.

The first UE may transmit, or receive, a second transmission, e.g., 520, with the adapted transmission parameter, at 722. The transmission or reception may be performed by the reception component 804 or transmission component 806 of apparatus 802.

Figure 8:
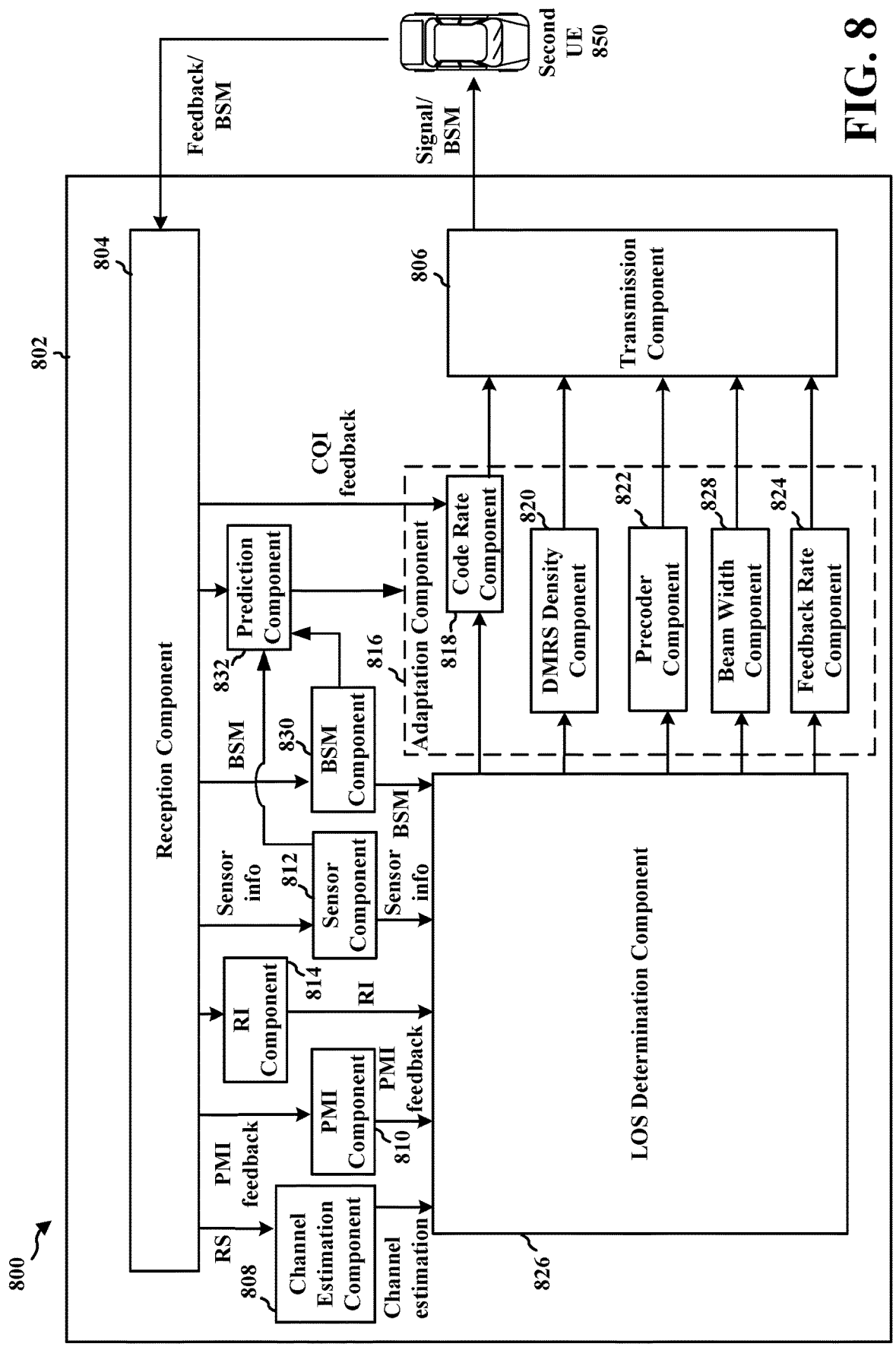
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus 802 may be a first UE or a component of a first UE (e.g., UE 104, 350, 402, 502) communicating with a second UE 850 (e.g., 310, 404, 504). The wireless communication may comprise V2X/V2V/CV2X/D2D communication, as described herein.

The apparatus includes a reception component 804 that receives communication from the second UE 850 and a transmission component 806 that transmits communication to the second UE 850. The apparatus may include a sensor component 812 configured to receive information about the second UE 850 (e.g., radar information, camera information, etc.). The apparatus may include a BSM component 830 configured to receive a BSM comprising information about the second UE. The apparatus may include a LOS determination component 826 that determines whether the apparatus and the second UE are in LOS condition, e.g., as described in connection with 608, 704. The apparatus may include an adaptation component 816 that adapts a transmission parameter for a second transmission, e.g., in a predictive manner, based on the determination by the LOS determination component 826.

The apparatus may include a channel estimation component 808 that performs a channel estimation, e.g., based on a reverse channel from the second UE to the apparatus. The channel estimation may be used by the LOS determination component 826. The apparatus may include a PMI component 810 that determines variations in the PMI feedback from the second UE within a time period. The determined variations may be used by the LOS determination component 826. The apparatus may include an RI component 814 that receives rank indicator feedback from the second UE. The RI feedback may be used by the LOS determination component 826. The LOS determination component 826 may determine whether an LOS condition exists in connection with one or more of the channel estimation component 808, the PMI component 810, the sensor component 812, the RI component 814, or the BSM component 830, e.g., as described in connection with 608 and 704.

The apparatus may include a code rate component 818 configured to adapt a code rate based on a predicted location/trajectory of the first UE or the second UE. The apparatus may include a DMRS density component 820 configured to adapt a DMRS density based on a predicted location/trajectory of the first UE or the second UE. The apparatus may include a precoder component 822 configured to adapt a precoder based on a predicted location/trajectory of the first UE or the second UE. The apparatus may include a beam width component 828 configured to adapt a beam width based on a predicted location/trajectory of the first UE or the second UE. The apparatus may include a feedback rate component 824 configured to adapt a feedback rate based on a predicted location/trajectory of the first UE or the second UE. The apparatus may adapt a transmission parameter for a second transmission based on a predicted location of the apparatus or the second UE. The apparatus may include a prediction component 832 that predicts the change in LOS path and/or that predicts a location or a trajectory for the first UE or the second UE.

The apparatus may include additional components that perform each of the blocks of the algorithm in the aforementioned flowcharts of FIGS. 5B-8. As such, each block in the aforementioned flowcharts of FIGS. 5B-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
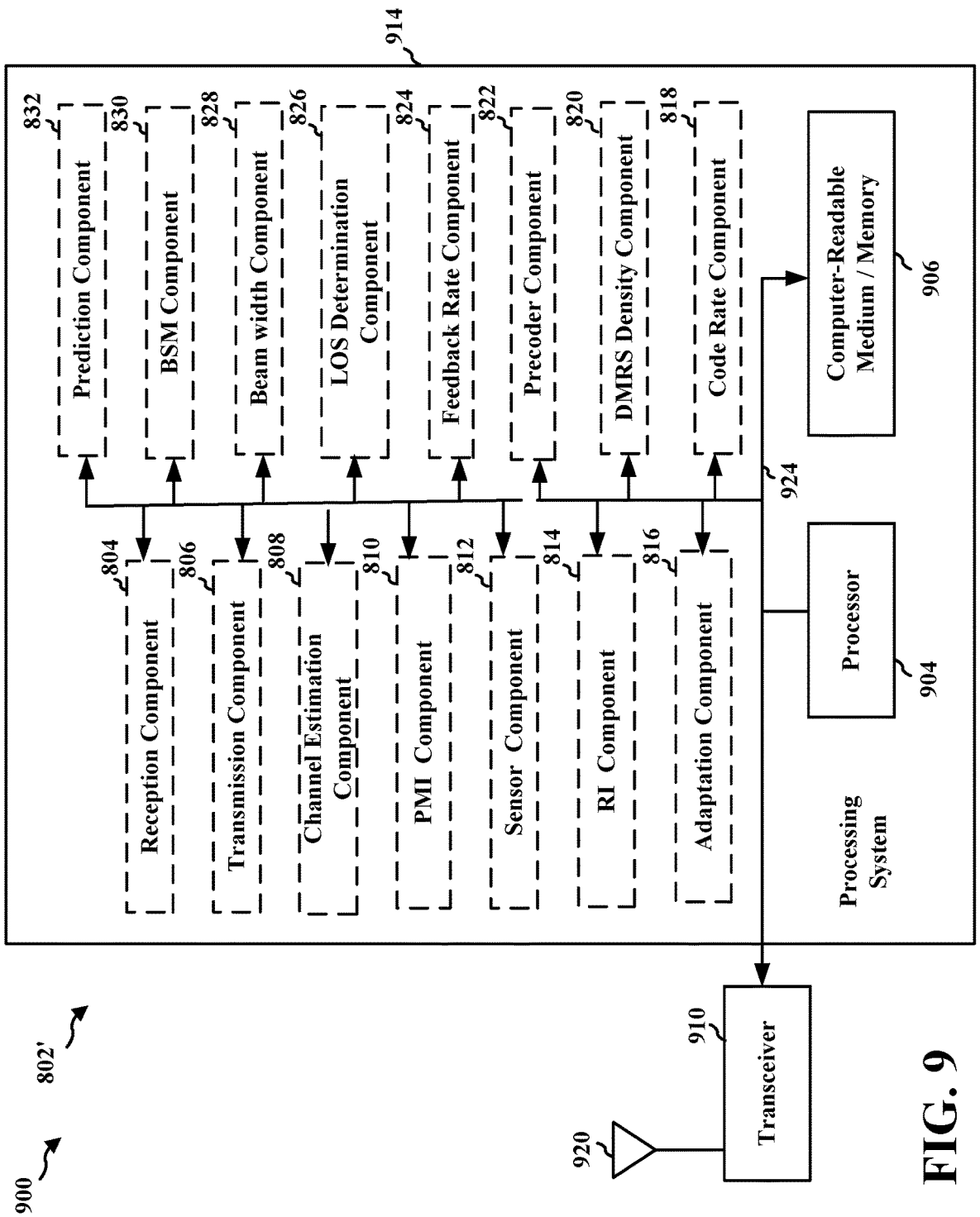
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, 816, 818, 810, 822, 824, 826, 828, 830, 832 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814, 816, 818, 810, 822, 824, 826, 828, 830, 832. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359. Alternately, the processing system 914 may comprise the entire UE 350.

In one configuration, the apparatus 802/802' for wireless communication includes means for transmitting a signal to, or receiving a signal from, a second UE; means for receiving information regarding the second UE; and means for determining whether the apparatus and the second UE are in a LOS condition based on correlation between the information about the second UE and one or more of a channel estimation, PMI feedback, or RI feedback. The apparatus may include means for predicting a change in an LOS path. The apparatus may include means for adapting a transmission parameter for communication between the first UE and the second UE based on determining the LOS condition. The apparatus may include means for communicating with a second UE including transmitting or receiving a first transmission. The apparatus may include means for adapting a transmission parameter for a second transmission based on a predicted location of the apparatus or the second UE, the transmission parameter including at least one of a code rate, a DMRS density, a precoder, a CSI-RS and a feedback rate. The apparatus may include means for determining whether a LOS path is stronger than a sum energy of non-LOS paths between the first UE and the second UE. The apparatus may include means for cycling through a selected set of precoders over a bandwidth of the second transmission. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication of a first user equipment (UE), comprising: transmitting a signal to, or receiving the signal from, a second UE; receiving information about the second UE from a sensor at the first UE or from a basic safety message (BSM), wherein the information comprises operation information about a vehicle associated with the second UE; and determining whether the first UE and the second UE are in a line-of-sight (LOS) condition based on a correlation of the information about the second UE with one or more of a channel estimation, precoding matrix indicator (PMI) feedback, or rank indicator (RI) feedback.

In Example 2, the method of example 1, further comprises predicting a change in an LOS path based on predicted location information for at least one of the first UE and the second UE.

In Example 3, the method of any of examples 1 or 2 further comprises that the LOS condition is determined at least based on the correlation of the information about the second UE with the channel estimation, and wherein the channel estimation is based on a reverse channel from the second UE to the first UE.

In Example, 4, the method of any of examples 1 to 3 further comprises that the LOS condition is determined at least based on the correlation of the information about the second UE with the channel estimation, and wherein the channel estimation is based on a reference signal (RS) in a feedback channel from the second UE.

In Example 5, method of any of examples 1 to 4 further comprises that the LOS condition is determined at least based on the correlation of the information about the second UE with the channel estimation, and wherein the channel estimation is based on a message transmission between the first UE and the second UE.

In Example 6, the method of any of examples 1 to 5 further comprises that the LOS condition is determined at least based on the correlation of the information about the second UE with variations in the PMI feedback from the second UE within a time period.

In Example 7, the method of any of examples 1 to 6 further comprises that the information about the second UE comprises location information received from the BSM.

In Example 8, the method of any of examples 1 to 7 further comprises that the information about the second UE comprises information from the sensor, and the LOS condition is determined at least based on the correlation of the information about the second UE with a feedback observed over a communication channel between the first UE and the second UE.

In Example 9, the method of any of examples 1 to 8 further comprises that the LOS condition is determined at least based on the correlation of the information about the second UE with the rank indicator feedback.

In Example 10, the method of any of examples 1 to 9 further comprises that the first UE further determines the LOS condition based on whether an energy of an LOS path is stronger than a sum energy of non-LOS (NLOS) paths between the first UE and the second UE.

In Example 11, the method of any of examples 1 to 10 further comprises adapting a transmission parameter for communication between the first UE and the second UE based on determining that the first UE and the second UE are in the LOS condition.

In Example, 12, the method of any of example 11 further comprises that the transmission parameter includes at least one of a modulation, a code rate, a demodulation reference signal (DMRS) density, a precoder, a channel state information-reference signal (CSI-RS) transmission periodicity or a feedback rate.

In Example 13, the method of any of examples 11 or 12 further comprises that the transmission parameter is adapted based on predicted location information for at least one of the first UE and the second UE when the first UE and the second UE are determined to be in the LOS condition.

In Example 14, the method of any of examples 1 to 13 further comprises that, at a first point in time, the first UE determines that the first UE and the second UE are not in the LOS condition, and at a second point in time, the first UE determines that the first UE and the second UE are in the LOS condition.

In Example 15, the method of example 14 further comprises that the first UE determines that the first UE and the second UE are not in the LOS condition at the first point in time based on an energy of an LOS path being weaker than a sum energy of non-LOS (NLOS) paths between the first UE and the second UE.

Example 16 is an apparatus for wireless communication at a first UE including means for implementing a method as in any of Examples 1 to 15.

Example 17 is an apparatus for wireless communication at a first UE including one or more memories in electronic communication with one or more processors, wherein at least one processor is configured to perform the method of any of Examples 1 to 15.

Example 18 is a non-transitory computer readable medium storing instructions executable by one or more processors to cause the one or more processors to implement a method as in any of Examples 1 to 15.

Example 19 is a method of wireless communication of a first user equipment (UE), comprising communicating with a second UE including transmitting or receiving a first transmission; and adapting a transmission parameter for a second transmission based on a predicted location of the first UE or the second UE, the transmission parameter including at least one of a modulation, a code rate, a demodulation reference signal (DMRS) density, a precoder, a channel state information-reference signal (CSI-RS) transmission periodicity or a feedback rate.

In Example 20, the method of Example 19 further comprises determining whether an energy of a line-of-sight (LOS) path is stronger than a sum energy of non-LOS (NLOS) paths between the first UE and the second UE, wherein the transmission parameter is adapted when the energy of the LOS path is determined to be stronger than the sum energy of the non-LOS paths.

In Example 21, the method of any of examples 19 or 20 further includes that the predicted location is determined based on at least one of information from a basic safety message (BSM) from the second UE or sensor information from a sensor at the first UE.

In Example 22, the method of any of examples 19 to 21 further includes that adapting the transmission parameter comprises adapting the code rate, and wherein the code rate is adapted based on predicted channel quality indicator (CQI) feedback for a predicted change in path-loss between the first UE and the second UE.

In Example 23, the method of example 22 further includes that the predicted CQI feedback includes predicted Acknowledgment/Negative Acknowledgment (ACK/NACK) feedback.

In Example 24, the method of any of examples 19 to 23 further includes that adapting the transmission parameter comprises adapting the DMRS density based on whether a dominant LOS path exists and based on a modulation and coding scheme (MCS).

In Example 25, the method of any of examples 19 to 24 further includes that adapting the transmission parameter comprises adapting the precoder to rotate a PMI feedback precoder based on a predicted change in an angle of arrival (AoA) relative to the second UE.

In Example 26, the method of any of examples 19 to 25 further includes that adapting the transmission parameter comprises adjusting a beam width based on an estimated range in the predicted location of the first UE or the second UE.

In Example 27, the method of any of examples 19 to 26 further includes that adapting the transmission parameter comprises adapting the precoder by selecting a set of precoders based on an estimated range in the predicted location of the first UE or the second UE.

In Example 28, the method of example 27 further comprises cycling through the set of precoders over a bandwidth of the second transmission.

In Example 29, the method of any of examples 19 to 28 further includes that adapting the transmission parameter comprises adapting the precoder based on the predicted location of the first UE, the predicted location of the second UE, and a predicted AoA relative to the second UE.

In Example 30, the method of any of examples 19 to 29 further includes that adapting the transmission parameter comprises adapting the feedback rate based on a predicted change in at least one of a location of the second UE and a trajectory of the second UE.

In Example 31, the method of any of examples 19 to 30 further includes that the adapting the transmission parameter comprises adapting the feedback rate based on a predicted change in at least one of a location of the first UE and a trajectory of the first UE.

In Example 32, the method of any of examples 19 to 31 further includes that the adapting the transmission parameter comprises adapting the feedback rate based on Acknowledgment/Negative Acknowledgment (ACK/NACK) feedback between the first UE and the second UE.

Example 33 is an apparatus for wireless communication at a first UE including means for implementing a method as in any of Examples 19 to 32.

Example 34 is an apparatus for wireless communication at a first UE including one or more memories in electronic communication with one or more processors, wherein at least one processor is configured to perform the method of any of Examples 19 to 32.

Example 35 is a non-transitory computer readable medium storing instructions executable by one or more processors to cause the one or more processors to implement a method as in any of Examples 19 to 32.

What is claimed is:
1. A method of wireless communication of a first user equipment (UE), comprising:
    communicating with a second UE including transmitting or receiving a first transmission; and
    adapting a transmission parameter for a second transmission based on a predicted future location of the first UE or the second UE, wherein adapting the transmission parameter includes at least one of:
        adapting a code rate based on predicted channel quality indicator (CQI) feedback for a predicted path-loss change in path-loss between the first UE and the second UE,
        adapting a demodulation reference signal (DMRS) density based on whether a dominant line of sight (LOS) path exists and based on a modulation and coding scheme (MCS), adapting a precoder to rotate a precoding matrix indicator (PMI) feedback precoder based on a predicted angle of arrival (AoA) change in an AoA relative to the second UE, adapting the precoder by selecting a set of precoders based on an estimated range in the predicted future location of the first UE or the second UE, adapting the precoder based on the predicted future location of the first UE, the predicted future location of the second UE, and a predicted AoA relative to the second UE, adapting a feedback rate based on a predicted change in a location and a trajectory of at least one of the first UE or the second UE, or adapting the feedback rate based on Acknowledgment/Negative Acknowledgment (ACK/NACK) feedback between the first UE and the second UE.

2. The method of claim 1, further comprising:
determining whether an energy of a line-of-sight (LOS) path is stronger than a sum energy of non-LOS (NLOS) paths between the first UE and the second UE, wherein the transmission parameter is adapted when the energy of the LOS path is determined to be stronger than the sum energy of the non-LOS paths.

3. The method of claim 1, wherein the predicted future location is determined based on at least one of information from a basic safety message (BSM) from the second UE or sensor information from a sensor at the first UE.

4. The method of claim 1, wherein adapting the transmission parameter comprises adapting the code rate, and wherein the code rate is adapted based on the predicted CQI feedback for the predicted path-loss change in the path-loss between the first UE and the second UE.

5. The method of claim 4, wherein the predicted CQI feedback includes predicted Acknowledgment/Negative Acknowledgment (ACK/NACK) feedback.

6. The method of claim 1, wherein adapting the transmission parameter comprises adapting the DMRS density based on whether the dominant LOS path exists and based on the MCS.

7. The method of claim 1, wherein adapting the transmission parameter comprises adapting the precoder to rotate the PMI feedback precoder based on the predicted AoA change in the AoA relative to the second UE.

8. The method of claim 1, wherein adapting the transmission parameter further comprises adjusting a beam width based on the estimated range in the predicted future location of the first UE or the second UE.

9. The method of claim 1, wherein adapting the transmission parameter comprises adapting the precoder by selecting the set of precoders based on the estimated range in the predicted future location of the first UE or the second UE.

10. The method of claim 9, further comprising:
cycling through the set of precoders over a bandwidth of the second transmission.

11. The method of claim 1, wherein adapting the transmission parameter comprises adapting the precoder based on the predicted future location of the first UE, the predicted future location of the second UE, and the predicted AoA relative to the second UE.

12. The method of claim 1, wherein adapting the transmission parameter comprises adapting the feedback rate based on the predicted change in at least one of the location of the second UE and the trajectory of the second UE.

13. The method of claim 1, wherein adapting the transmission parameter comprises adapting the feedback rate based on the predicted change in at least one of the location of the first UE and the trajectory of the first UE.

14. The method of claim 1, wherein adapting the transmission parameter comprises adapting the feedback rate based on the ACK/NACK feedback between the first UE and the second UE.

15. An apparatus for wireless communication of a first user equipment (UE), comprising:
means for communicating with a second UE including transmitting or receiving a first transmission; and
means for adapting a transmission parameter for a second transmission based on a predicted future location of the apparatus or the second UE, wherein adapting the transmission parameter includes at least one of:
adapting a code rate based on predicted channel quality indicator (CQI) feedback for a predicted path-loss change in path-loss between the first UE and the second UE,
adapting a demodulation reference signal (DMRS) density based on whether a dominant line of sight (LOS) path exists and based on a modulation and coding scheme (MCS),
adapting a precoder to rotate a precoding matrix indicator (PMI) feedback precoder based on a predicted angle of arrival (AoA) change in an AoA relative to the second UE,
adapting the precoder by selecting a set of precoders based on an estimated range in the predicted future location of the first UE or the second UE,
adapting the precoder based on the predicted future location of the first UE, the predicted future location of the second UE, and a predicted AoA relative to the second UE,
adapting a feedback rate based on a predicted change in a location and a trajectory of at least one of the first UE or the second UE, or
adapting the feedback rate based on Acknowledgment/Negative Acknowledgment (ACK/NACK) feedback between the first UE and the second UE.

16. The apparatus of claim 15, wherein the means for adapting the transmission parameter are configured to adapt the code rate based on adjusting the CQI feedback for the predicted path-loss change in the path-loss between the first UE and the second UE.

17. The apparatus of claim 15, wherein the means for adapting the transmission parameter are configured to adapt the DMRS density based on whether the dominant LOS path exists and based on the MCS.

18. The apparatus of claim 15, wherein the means for adapting the transmission parameter are configured to adapt the precoder by rotating the PMI feedback precoder based on the predicted AoA change in the AoA relative to the second UE.

19. The apparatus of claim 15, wherein the means for adapting the transmission parameter are configured to adapt the feedback rate based on the predicted change in the at least one of the location and the trajectory of at least one of the second UE and the first UE.

20. An apparatus for wireless communication of a first user equipment (UE), comprising:
a memory; and
at least one processor coupled to the memory and configured to:
communicate with a second UE including transmitting or receiving a first transmission; and
adapt a transmission parameter for a second transmission based on a predicted future location of the apparatus or the second UE, wherein adaptation of the transmission parameter includes at least one of:
- a first adaptation of a code rate based on predicted channel quality indicator (CQI) feedback for a predicted path-loss change in path-loss between the first UE and the second UE,
- a second adaptation of a demodulation reference signal (DMRS) density based on whether a dominant line of sight (LOS) path exists and based on a modulation and coding scheme (MCS),
- a third adaptation of a precoder to rotate a precoding matrix indicator (PMI) feedback precoder based on a predicted angle of arrival (AoA) change in an AoA relative to the second UE,
- a fourth adaptation of the precoder by selecting a set of precoders based on an estimated range in the predicted future location of the first UE or the second UE,
- a fifth adaptation of the precoder based on the predicted future location of the first UE, the predicted future location of the second UE, and a predicted AoA relative to the second UE,
- a sixth adaptation of a feedback rate based on a predicted change in a location and a trajectory of at least one of the first UE or the second UE, or
- a seventh adaptation of the feedback rate based on Acknowledgment/Negative Acknowledgment (ACK/NACK) feedback between the first UE and the second UE.

21. The apparatus of claim 20, wherein to adapt the transmission parameter, the at least one processor is configured to adapt the code rate based on adjusting the CQI feedback for the predicted change in path-loss between the first UE and the second UE.

22. The apparatus of claim 20, wherein to adapt the transmission parameter, the at least one processor is configured to adapt the DMRS density based on whether the dominant LOS path exists and based on the MCS.

23. The apparatus of claim 20, wherein to adapt the transmission parameter, the at least one processor is configured to adapt the precoder by rotating the PMI feedback precoder based on the predicted AoA change in the AoA relative to the second UE.

24. The apparatus of claim 20, wherein to adapt the transmission parameter, the at least one processor is configured to adapt the feedback rate based on the predicted change in at least one of the location and the trajectory of at least one of the second UE or the first UE.

25. The apparatus of claim 20, wherein to adapt the transmission parameter, the at least one processor is configured to adapt the precoder by selecting the set of precoders based on the estimated range in the predicted future location of the first UE or the second UE.

26. The apparatus of claim 20, wherein to adapt the transmission parameter, the at least one processor is configured to adapt the feedback rate based on the ACK/NACK feedback between the first UE and the second UE.

27. A non-transitory computer-readable medium storing instructions for wireless communication at a first user equipment (UE), the instructions executable by one or more processors to cause the one or more processors to:
- communicate with a second UE including transmitting or receiving a first transmission; and
- adapt a transmission parameter for a second transmission based on a predicted future location of the first UE or the second UE, wherein adaptation of the transmission parameter includes at least one of:
  - a first adaptation of a code rate based on predicted channel quality indicator (CQI) feedback for a predicted path-loss change in path-loss between the first UE and the second UE,
  - a second adaptation of a demodulation reference signal (DMRS) density based on whether a dominant line of sight (LOS) path exists and based on a modulation and coding scheme (MCS),
  - a third adaptation of a precoder to rotate a precoding matrix indicator (PMI) feedback precoder based on a predicted angle of arrival (AoA) change in an AoA relative to the second UE,
  - a fourth adaptation of the precoder by selecting a set of precoders based on an estimated range in the predicted future location of the first UE or the second UE,
  - a fifth adaptation of the precoder based on the predicted future location of the first UE, the predicted future location of the second UE, and a predicted AoA relative to the second UE,
  - a sixth adaptation of a feedback rate based on a predicted change in a location and a trajectory of at least one of the first UE or the second UE, or
  - a seventh adaptation of the feedback rate based on Acknowledgment/Negative Acknowledgment (ACK/NACK) feedback between the first UE and the second UE.

* * * * *